(12) United States Patent
Zeiler et al.

(10) Patent No.: US 9,915,238 B2
(45) Date of Patent: *Mar. 13, 2018

(54) OUTDOOR POWER EQUIPMENT INCORPORATING STARTER BATTERY WITH INTEGRATED PUSH BUTTON

(71) Applicant: Briggs & Stratton Corporation, Wauwatosa, WI (US)

(72) Inventors: Jeffrey Zeiler, Pewaukee, WI (US); Robert John Koenen, Pewaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,748

(22) Filed: Feb. 28, 2017

(65) Prior Publication Data

US 2017/0167462 A1    Jun. 15, 2017

Related U.S. Application Data

(63) Continuation of application No. 14/625,661, filed on Feb. 19, 2015, now Pat. No. 9,624,891.

(60) Provisional application No. 61/943,024, filed on Feb. 21, 2014, provisional application No. 62/027,824, filed on Jul. 23, 2014.

(51) Int. Cl.
| | |
|---|---|
| *F02N 11/00* | (2006.01) |
| *H02P 9/04* | (2006.01) |
| *F02N 11/08* | (2006.01) |
| *H02J 7/00* | (2006.01) |

(52) U.S. Cl.
CPC ...... *F02N 11/0862* (2013.01); *F02N 11/0803* (2013.01); *H02J 7/0021* (2013.01); *H02J 7/0063* (2013.01); *F02N 2200/061* (2013.01)

(58) Field of Classification Search
CPC ...... F02N 11/0803; F02N 11/12; F02N 11/14; F02N 11/087; H02J 7/0045; H02J 7/0047
USPC .............................................. 290/38 C, 38 R
See application file for complete search history.

(56) References Cited

U.S. PATENT DOCUMENTS

| | | |
|---|---|---|
| 5,208,525 A | 5/1993 | Lopic et al. |
| 5,736,271 A | 4/1998 | Cisar et al. |
| 5,794,580 A | 8/1998 | Galletti |
| 6,321,707 B1 | 11/2001 | Dunn |
| 7,280,200 B2 | 2/2007 | Walter et al. |
| 7,309,928 B2 | 12/2007 | Grant et al. |
| 7,687,926 B2 | 3/2010 | Grant et al. |
| 7,782,626 B2 | 8/2010 | Buck et al. |

(Continued)

*Primary Examiner* — Tulsidas C Patel
*Assistant Examiner* — Thomas Quigley
(74) *Attorney, Agent, or Firm* — Andrus Intellectual Property Law, LLP (57) ABSTRACT

A starter battery pack with a start button included as part of the starter battery pack is shown and described. The starter battery pack includes a start button that, when the starter battery pack is received within a receptacle of outdoor power equipment, such as a lawn tractor, allows the starter battery pack to provide power to a starting circuit of the power equipment. The battery pack is selectively rechargeable and preferably is a type of battery, such as lithium ion, that can be repeatedly discharged and recharged without affecting battery life. When the starter battery pack is received within the receptacle, activation of the start button provides current and voltage from the starter battery pack to an electric starter motor, which initiates operation of the internal combustion engine.

8 Claims, 6 Drawing Sheets

(56) References Cited

U.S. PATENT DOCUMENTS

| | | |
|---|---|---|
| 7,989,969 B2 | 8/2011 | Grant et al. |
| 8,159,078 B2 | 4/2012 | Usselman et al. |
| 8,319,357 B2 | 11/2012 | Usselman et al. |
| 8,490,592 B1 | 7/2013 | Von Tiergen |
| 8,733,072 B2 | 5/2014 | Hansen et al. |
| 8,857,138 B2 | 10/2014 | Hansen et al. |
| 2005/0007068 A1 | 1/2005 | Johnson et al. |
| 2006/0170218 A1 | 8/2006 | Grant et al. |
| 2007/0120366 A1 | 5/2007 | Grant et al. |
| 2007/0125056 A1 | 6/2007 | Edmond |
| 2008/0217083 A1 | 9/2008 | Serkh et al. |
| 2009/0284022 A1 | 11/2009 | Usselman et al. |
| 2009/0295169 A1 | 12/2009 | Usselman et al. |
| 2011/0118961 A1 | 5/2011 | Koenen et al. |
| 2013/0111864 A1 | 5/2013 | Hansen et al. |
| 2013/0111865 A1 | 5/2013 | Hansen et al. |
| 2013/0343906 A1 | 12/2013 | Funke et al. |
| 2014/0230393 A1 | 8/2014 | Hansen et al. |
| 2014/0299089 A1 | 10/2014 | Koenen et al. |
| 2014/0345555 A1 | 11/2014 | Koenen et al. |

OUTDOOR POWER EQUIPMENT INCORPORATING STARTER BATTERY WITH INTEGRATED PUSH BUTTON

CROSS-REFERENCE TO RELATED APPLICATIONS

The present application is a continuation of U.S. patent application Ser. No. 14/625,661, filed Feb. 19, 2015, which is based on and claims priority to U.S. Provisional Patent Application Ser. No. 61/943,024 filed Feb. 21, 2014, and U.S. Provisional Patent Application Ser. No. 62/027,824 filed Jul. 23, 2014, the disclosures of which are incorporated herein by reference.

BACKGROUND

The present disclosure relates to a starting circuit for use with outdoor power equipment such as a lawn tractor. More specifically, the present disclosure relates to a starter battery pack that includes a start button and is removably received in a battery receptacle of the outdoor power equipment.

Presently, many different types of outdoor power equipment include electronic starting circuits that allow the user to start the internal combustion engine of the outdoor power equipment through either a switch or a push button. Most of these starting systems typically include a lead acid battery that provides the voltage and current required for activating the starting system of the outdoor power equipment. In many cases, the lead acid battery is a 12-volt battery that is recharged during operation of the outdoor power equipment.

Although lead acid batteries have been used for a very long time and are relatively inexpensive, if the voltage stored by the lead acid battery is completely depleted, the lead acid battery may become ineffective at storing a charge and would thus need to be replaced. Since many pieces of outdoor power equipment can sit idle for extended periods of time, if the lead acid battery is not removed and kept charged, the lead acid battery can become completely discharged and thus must be replaced.

Presently, some types of lawn and garden equipment utilize a lithium ion battery pack to provide primary power for the lawn and garden equipment. As an example, leaf blowers, weed trimmers and edgers often use lithium battery packs to provide continuous running power for the equipment Once the equipment is no longer in use, the lithium ion battery pack is removed and recharged utilizing a wall charger. Lithium ion battery packs can be completely discharged and subsequently recharged without any damage to the storage capacity of the battery. However, lithium ion battery packs are significantly more expensive than lead acid batteries.

SUMMARY

The present disclosure relates to a starter battery pack for use with a piece of outdoor power equipment, such as a lawn tractor. More specifically, the starter battery pack includes a push-to-start button or switch such that when the starter battery pack is received on the outdoor power equipment, the push-to-start button can be utilized to supply power from the starter battery pack to a starter motor to initiate operation of the internal combustion engine of the power equipment.

The outdoor power equipment, such as a lawn tractor, includes an internal combustion engine. The power equipment further includes an electric starter motor that is coupled to the internal combustion engine to start the internal combustion engine. The electric starter motor receives a supply of electric power from a starter battery pack that can be removed and received on the outdoor power equipment. In one embodiment, the starter battery pack includes a plurality of individual battery cells that provide the required current and voltage to activate the electric starter motor. The starter battery pack can include a plurality of individual battery cells, such as lithium ion battery cells.

The starter battery pack includes a start button or switch formed as part of the starter battery pack. The start button in located on a surface or face of the starter battery pack such that the start button is accessible to a user when the starter battery pack is received on the outdoor power equipment. When the start button is activated by a user, the voltage and current stored within the starter battery pack is supplied to the electric starter motor. The power supplied by the starter battery pack is sufficient to allow the starter motor to initiate operation of the internal combustion engine.

In one embodiment of the disclosure, the outdoor power equipment includes a battery receptacle that is mounted somewhere on the outdoor power equipment. The battery receptacle is sized to removably receive the starter battery pack and provide an electrical connection between the starter battery pack and the electric starter motor. The starter battery pack and the battery receptacle are designed such that the start button is accessible to the user when the starter battery pack is received in the battery receptacle. The starter battery pack is designed to be removable from the battery receptacle for recharging without any additional tools. In one contemplated embodiment, the starter battery pack and the battery receptacle can include unique mating components such that only a certain starter battery pack can be received within the battery receptacle on the outdoor power equipment.

The outdoor power equipment can further include an engine control circuit that allows electric power to be directed to the starter motor upon activation of the start button when the internal combustion engine is not operating. Once the internal combustion engine begins to operate, the engine control circuit disconnects the starter battery pack from the starter motor to prevent undesired discharge of the starter battery pack.

During operation of the internal combustion engine, if the start button on the starter battery pack is depressed, the engine control circuit terminates operation of the internal combustion engine. In this manner, the start button contained on the starter battery pack can control both the initial activation and termination of operation of the internal combustion engine.

The starter battery pack can further include one or more indicators that provide a visual indication of operating parameters of either the starter battery pack or the internal combustion engine. In one contemplated embodiment, the visual indicator indicates the state of charge of the battery pack. In another alternate embodiment, the indicators indicate the operating state of the internal combustion engine.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

The present disclosure is directed to a starting system for an internal combustion engine of a piece of outdoor power equipment. This equipment could include a snowthrower, a power washer, a portable generator, a power tiller, a walk behind mower, turf-care equipment, a zero-turn radius mower, a garden tractor, off-road utility vehicles, all-terrain vehicles or other engine driven outdoor power equipment such as a lawn tractor. The drawing figures depict the use of the starting system with a lawn tractor. However, it should be understood that the starting system could be utilized with other types of outdoor power equipment while falling within the scope of the present disclosure.

Figure 1:
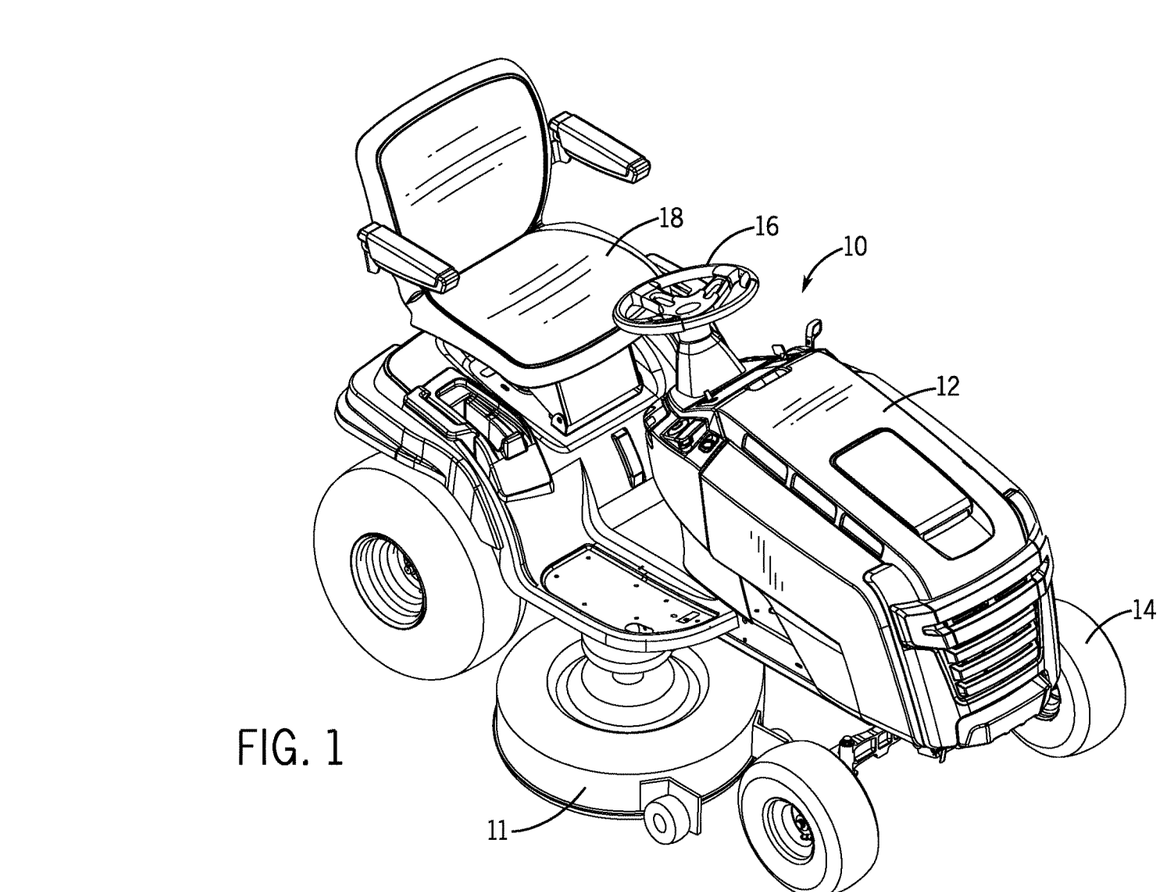
FIG. 1 is a front perspective view of a lawn tractor incorporating the starter battery with integrated push button of the present disclosure.

FIG. 1 illustrates a riding lawn tractor 10 that includes a mowing assembly 11 mounted beneath a vehicle chassis 12 supported by four wheels 14. The lawn tractor 10 includes an internal combustion engine that powers both the rear drive wheels and the mower blade contained within the mowing assembly 11. A steering wheel 16 allows an operator positioned in the seat 18 to control the movement of the lawn tractor 10, as is conventional. The details of the lawn tractor 10 shown in FIG. 1 are meant of illustrative purposes only, since the lawn tractor 10 could have various different operator controls and physical configurations while falling within the scope of the present disclosure.

Figure 2:
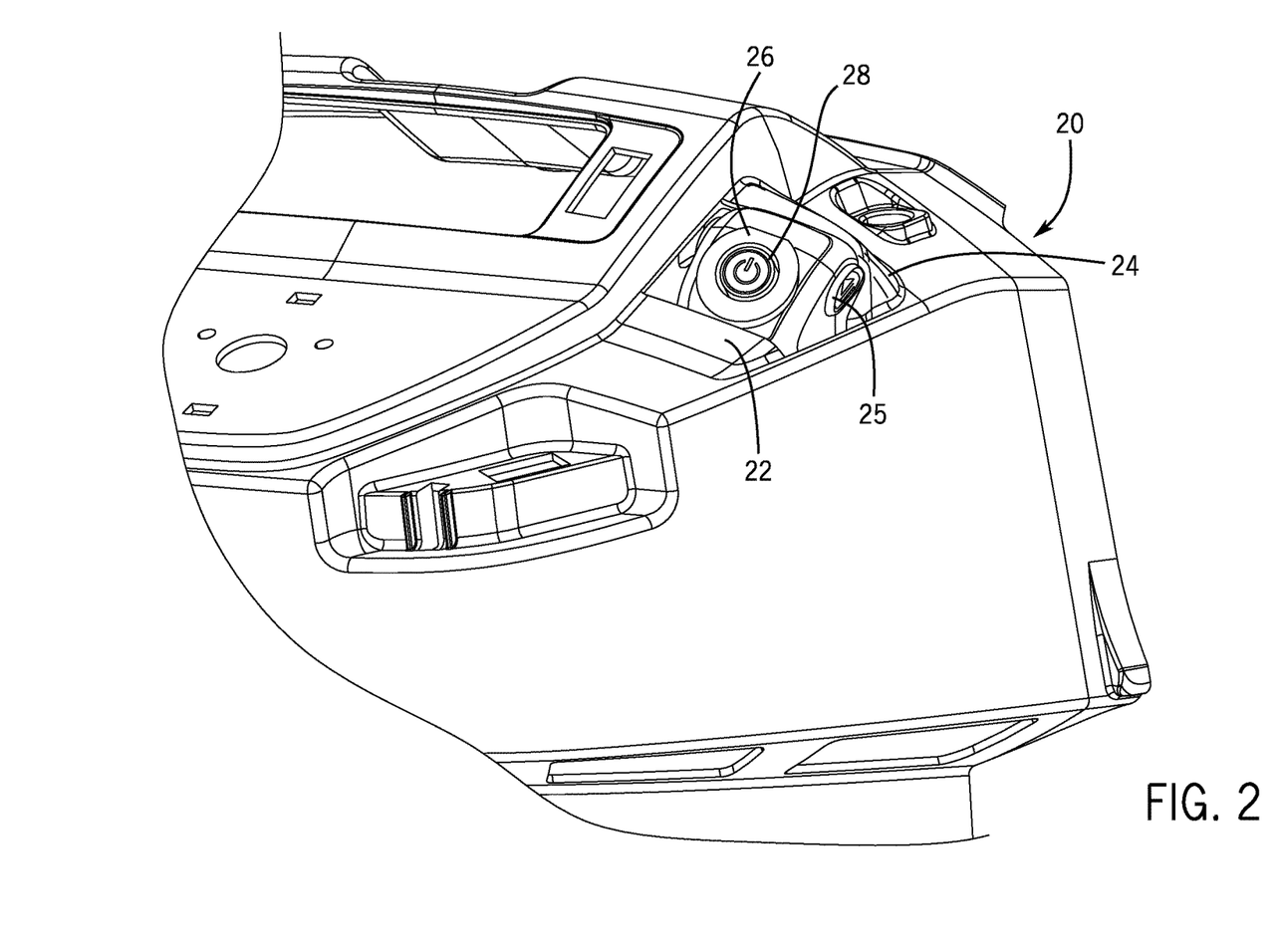
FIG. 2 is a perspective view of a portion of the front dash of the lawn tractor showing the battery receptacle and the starter battery pack.

FIG. 2 generally illustrates the molded shell of a dashboard 20 that is visible to the operator when the operator is in the seated position. In the embodiment shown in FIG. 2, many of the operating controls and displays are removed from the molded shell of the dashboard 20. However, it should be understood that these controls and displays would be included in the dashboard 20 when the dashboard 20 is installed on the lawn tractor.

Figure 4:
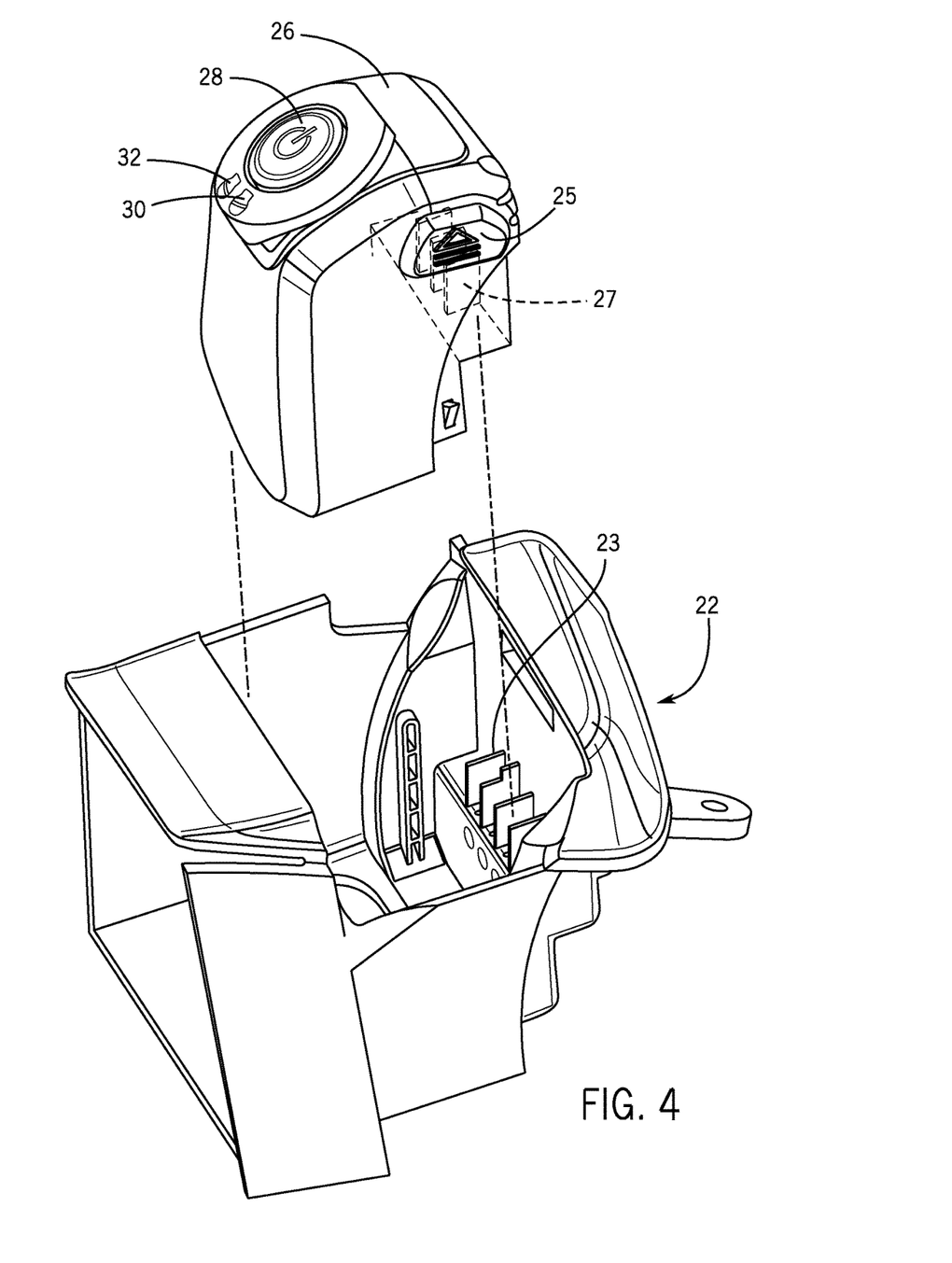
FIG. 4 is a view showing the starter battery pack removed from the battery receptacle of one embodiment of the disclosure.

As illustrated in FIGS. 2 and 4, the dashboard 20 includes a starter battery receptacle 22 that is received within a cutout 24 formed in the dashboard 20. The starter battery receptacle 22 includes a series of electrical contacts 23 that are connected to electrical wires (not shown) that lead to the starter motor. The electrical contact 23 of the battery receptacle engage similar contacts 27 on the starter battery pack and thus provide the electrical connection from the battery pack to the electric starter motor.

Figure 3:
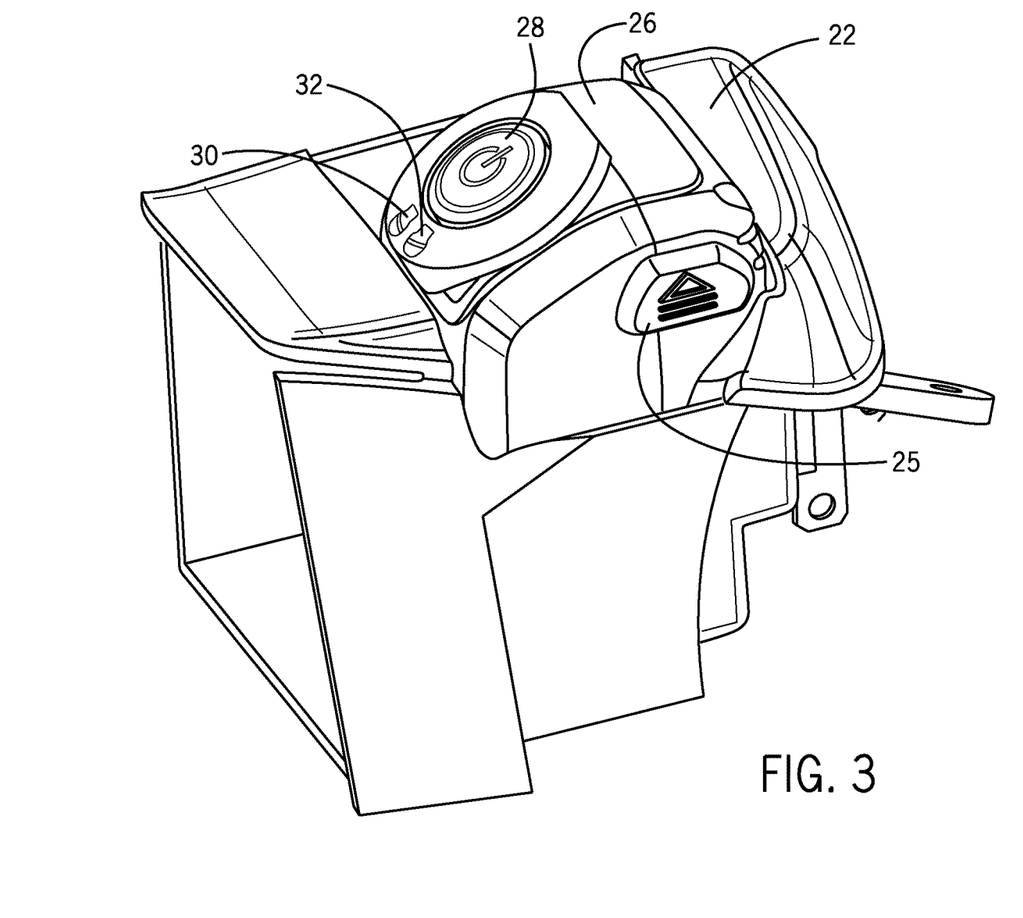
FIG. 3 is a magnified view similar to FIG. 3 showing the receipt of the starter battery pack within the battery receptacle.

The battery receptacle 22 includes a latching mechanism that holds the starter battery pack 26 within the battery receptacle 22 during use. The starter battery pack 26 includes one or more release buttons 25 that may be depressed by an operator to release the starter battery pack 26 from the receptacle 22. The release button or buttons 25 allow the starter battery pack to be removed from the battery receptacle 22 without any external tools. The starter battery pack 26 locks or latches into place in the battery receptacle 22 to securely hold the starter battery pack during operation of the lawn tractor or other outdoor power equipment. FIGS. 2 and 3 illustrate the receipt of a lithium ion (Li-Ion) starter battery pack 26 within the battery receptacle 22. The starter battery pack 26 includes an outer housing that surrounds a plurality of individual lithium ion battery cells that combine to generate an output voltage and current. Although Li-Ion is the preferred type of battery chemistry, other battery chemistries could be utilized within the scope of the present disclosure. The starter battery pack 26 acts as the starting battery for providing electrical energy to an electric starter motor mounted on the internal combustion engine of the lawn tractor. When the start button 28, which may be a push button, an inductive or capacitive sensor or a key switch, is activated by the operator, electrical energy from the starter battery pack 26 is delivered to the electric starter motor and the internal combustion engine is started.

Although not illustrated in FIGS. 2 and 3, the outer housing of the starter battery pack 26 includes one or more alignment grooves that are used to guide the starter battery pack 26 into position within the battery receptacle 22. The alignment grooves and the release button 25 allow the starter battery pack 26 to be accurately positioned within the battery receptacle 22 such that the contacts on the battery pack align with the contacts within the battery receptacle 22. The battery pack can be removed from the battery receptacle 22 by depressing the release button 25 and physically moving the battery pack away from the receptacle. The removable starter battery pack 26 may be further configured with a security device to prevent unauthorized starting of the lawn tractor. That is, the starter battery pack 26 may be electronically configured to be unique to the particular lawn tractor that it is used with, not unlike a garage door opener or remote-entry fob for a vehicle. A transmitter, hardwired communications interface, RF tag, or other wireless interface (Bluetooth/WiFi/NFC/etc.) within the starter battery pack 26 may sync to a receiver located on the piece of equipment or within the receptacle 22 contained on the equipment to be started to allow for a "handshake" authorization to start the engine of the equipment. Thus, not only can the operator ensure that the engine will not be started if a battery pack is not mounted to the appropriate receptacle, but the equipment may further limit the particular battery pack used to start the engine. This configuration provides greater security and ensures that only authorized use of the equipment is possible.

As best illustrated in FIG. 3, the starter battery pack 26 includes a start button 28 formed on one face or surface of the battery pack housing such that the start button 28 is accessible to the operator through the outer housing of the starter battery pack 26 when the starter battery pack 26 in received within the battery receptacle. It is contemplated that the starter battery pack 26 could be received in the battery receptacle 22 at various different angles depending on the location of the battery receptacle on the power equipment. In these different configurations, the start button 28 may be located on different faces or surfaces of the battery housing as long as the start button 28 is readily accessible to the user.

The start button 28 on the battery pack allows the operator to initiate operation of the internal combustion engine of the lawn tractor. In the embodiment illustrated, the start button 28 is a push-to-operate button can be backlit to make it more clearly visible to the user that depression of the start button 28 will begin operation of the internal combustion engine of the lawn tractor. In alternative embodiments, other useroperated interfaces may be provided on the battery pack to function as the start button to allow the user to start the internal combustion engine, such as but not limited to a key switch, a resistive or capacitive touch sensor, a slide switch, a turn switch or other similar device.

Although the embodiment shown in FIGS. 2 and 3 includes a push-to-start button 28, the receptacle 22 could be configured such that the internal combustion engine would automatically start when the starter battery pack 26 is received within the battery receptacle 22. In such an embodiment, the start button 28 could be utilized to terminate operation of the internal combustion engine after the engine has started after insertion of the starter battery pack 26 as desired by the user.

In the embodiment shown in FIGS. 2 and 3, the front display portion of the starter battery pack 26 includes a pair of visual indicators 30 and 32 that can be used to relay information to the operator. As an example, the visual indicator 30 could be used to indicate current cranking of the engine while indicator 32 could be used to indicate operation of the internal combustion engine. One of the visual indicators 30 and 32 could also be configured to indicate the current state of charge of the starter battery pack 26.

In one embodiment of the disclosure, the start button 28 could be a push-and-hold-to-crank button such that the user would hold down the start button 28 until the engine started. Alternatively, the starter battery pack 26 could be configured to allow the user to simply tap the start button 28 such that the starting circuit would initiate operation of the internal combustion engine.

Although the battery receptacle 22 is shown in the embodiment of FIGS. 2-4 as being positioned on the front of the dashboard, it should be understood that the battery receptacle could be located at different positions on the lawn tractor. As an example, the battery receptacle could be positioned closer to the seat of the lawn tractor or below the steering column. Additionally, the configuration of the battery receptacle and the physical configuration of the starter battery pack 26 could also be modified. As one contemplated embodiment, the battery receptacle could be configured as a vertical cylinder that is designed to receive a drop in starter battery pack. In such an embodiment, the battery pack could simply be dropped into the battery receptacle and the start button 28 would be visible from the exterior of the tractor-board.

As illustrated in FIGS. 2-3, a user can depress the start button 28 to begin the operation of the internal combustion engine. When the start button 28 is depressed, the lithium ion starter battery pack 26 provides a relatively high current to the electric starter motor to start the internal combustion engine. Once the internal combustion engine has started, the user can again depress the start button 28 to terminate operation of the internal combustion engine. In this manner, the start button 28 can function as both a starting button and a stopping button.

As described previously, the starter battery pack 26 can include alignment grooves that can be uniquely configured such that the starter battery pack 26 works only with authorized lawn tractors. Alternatively, the starter battery pack 26 can be created with other types of security measures to insure that the starter battery pack 26 works only with desired lawn tractors. When the starter battery pack 26 is configured with such security feature, the starter battery pack 26 can function as a "key" to insure that only the specified starter battery pack for the lawn tractor can be used to start the lawn tractor.

As another alternate embodiment, if the starter battery pack 26 is removed from the lawn tractor, the removal could electrically short the ignition, thereby forcing a shutdown. The removal of the starter battery pack 26 in such an embodiment would function as another way to terminate operation of the internal combustion engine of the lawn tractor.

Figure 6:
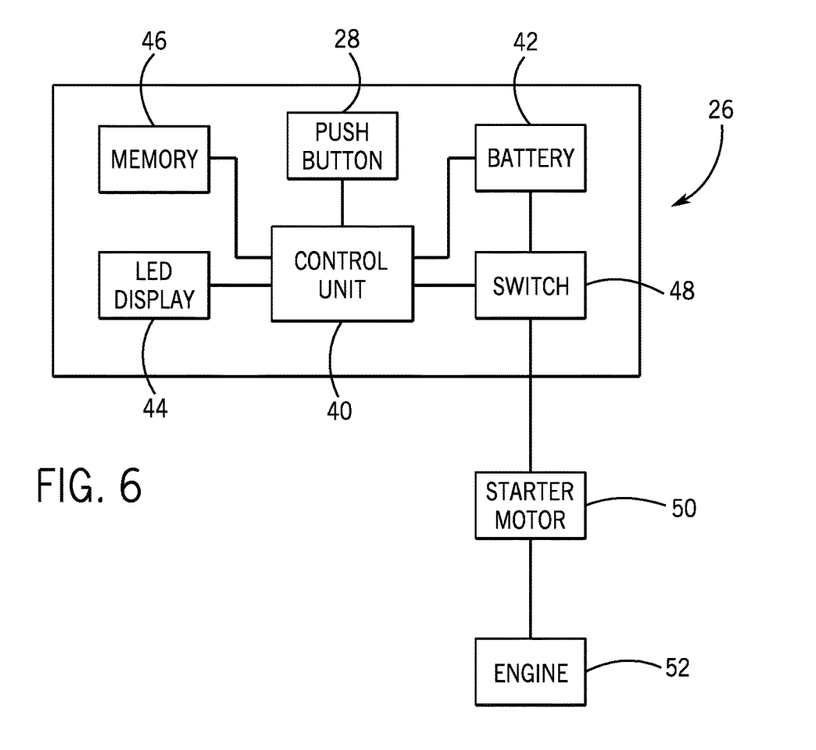
FIG. 6 is a schematic illustration of the operating components of the starter battery pack.

Referring now to FIG. 6, the internal components of the starter battery pack 26 are illustrated. The starter battery pack 26 includes a control unit 40. The control unit 40 controls the functionality of the starter battery pack 26 and receives an input signal from the user through the start button 28. The control unit 40 is in communication with the individual internal lithium ion battery cells 42 such that the control unit 40 can monitor the charging status of the battery cells 42. The control unit is in further communication with the LED display 44 such that the control unit 40 can indicate to the user the amount of charge remaining on the battery 42. In an alternate embodiment, the control unit 40 could show the estimated number of starts remaining in the starter battery pack. In such an embodiment, the user could then make decisions about use of the lawn tractor before recharging the starter battery pack 26. It is also contemplated that the outdoor power equipment could include an internal charging circuit such that the operation of the internal combustion engine would recharge the starter battery pack when installed on the power equipment. A memory device 46 is in communication with the control unit such that the control unit 40 can store information regarding the time of use of the lawn tractor.

The control unit 40 is in further communication with a switching device 48 that is positioned between the battery cells 42 and an electric starting motor 50. The switching device 48 can have many different forms while operating with the scope of the present disclosure. In the embodiment illustrated, the switch 48 is a simple switch that, when activated by the control unit 40, provides an electric path from the battery cells 42, through the battery receptacle and to the starting motor 50. The switching device 48 could also be replaced with different types of solid state switching devices, such as a transistor or MOSFET, while operating within the scope of the present disclosure.

The starting motor 50, in turn, is operatively connected to the internal combustion engine 52 and, when supplied with power, starts the internal combustion engine. Thus, when a user depresses the start button 28, the depression of the start button 28 is sensed by the control unit 40 which closes the switching device 48. Closure of the switching device 48 allows voltage and current to flow from the battery cells 42 through the battery receptacle and to the starting motor 50.

The embodiment of FIG. 6 is a simplified version of the electronic components contained within the starter battery pack 26. In an alternate embodiment, the control unit 40 could be connected to one or more sensors that could be utilized to indicate starting of the internal combustion engine. As an illustrative example, the control unit could be connected to a vibration sensor. The vibration sensor could detect when the internal combustion engine starts and, based upon this information, the control unit would then open the switch 48 to disrupt the supply of voltage and current to the electric starting motor 50. In an embodiment in which the battery pack receptacle is located away from the internal combustion engine, it is desirable that the control unit 40 be able to recognize when the internal combustion engine has started. In some embodiments, wiring from the internal combustion engine could be directed to the receptacle and thus the battery pack. However, it is desirable that no additional wiring be needed from the receptacle to the internal combustion engine to reduce the complexity of the connections within the outdoor power equipment It is contemplated that the starter battery pack 26 could include a wireless receiver that would receive wireless signals from control circuits used to operate the internal combustion engine. In this manner, the starter battery pack 26 could receive an indication that the engine has started without requiring a hard wire connection between the receptacle and the control circuit for the internal combustion engine. It is contemplated that a MEMS sensor could be one type of sensor utilized with the control unit of the battery pack. The MEMS sensor could be used to detect vibration. In such an embodiment, the control unit 40 can then determine whether the engine is started without requiring any hard wire connections to the engine control circuit.

Figure 5:
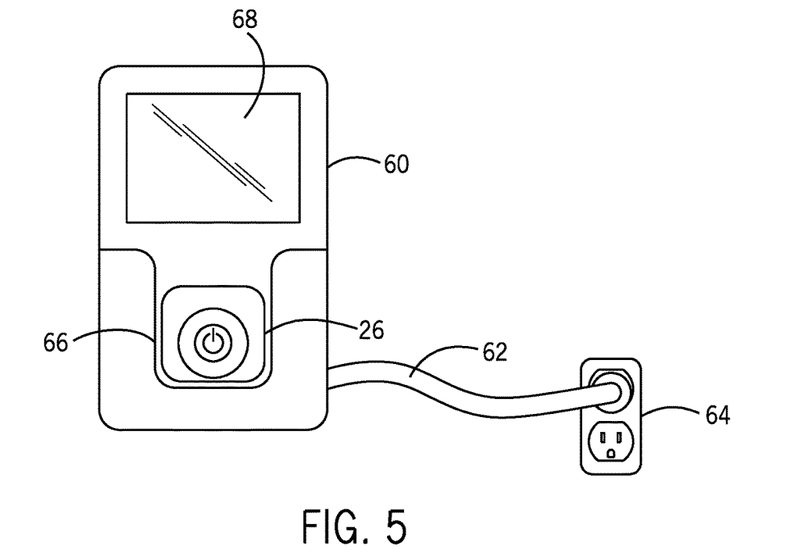
FIG. 5 is a schematic illustration of a wall charger utilized to recharge the starter battery pack.

FIG. 5 illustrates a wall charger 60 that could be utilized to recharge the starter battery pack 26. The wall charger 60 includes a power cord 62 connected to a wall outlet 64. Alternatively, the wall charger 60 could plug directly into the wall socket without the need for the power cord 62. In yet another contemplated embodiment, a wall charger could plug into the wall outlet and include a charging cord having a plug that is received within the starter battery pack, such as a common DC barrel plug/jack that is often used on PC equipment. In the embodiment shown, the wall charger 60 charges the starter battery pack 26 when the starter battery pack 26 is received within the receptacle 66.

In the embodiment shown in FIG. 5, the wall charger 60 includes a display 68 that can be used to present the user with information regarding the outdoor power equipment on which the starter battery pack 26 is utilized. As described with reference to FIG. 6, the starter battery pack 26 includes a memory 46 that can be used by the control unit to store various different types of operational information regarding the internal combustion engine of the outdoor power equipment. In one example, the control unit can store time of use information, the number of starts of the internal combustion engine per charge on the starter battery pack, the number of hours of operation and total number of starts.

When the starter battery pack 26 is received within the receptacle 66 of the wall charger 60, the wall charger can read the memory contained within the starter battery pack and display information on the display screen 68. For example, the wall charger could inform the owner of the number of hours of operation of the power equipment and the number of times the equipment has been started. This information can be used by the owner to determine the remaining useful life of the battery pack. In addition, the wall charger 60 can be configured to send information to another device or a software application over a wireless network, a wired network, a PLC power line network or any other type of communication system. The information received from the starter battery pack 26 can be used to analyze the operation of the outdoor power equipment.

The display 68 of the wall charger 60 can be configured to display other information to the operator, such as the status of maintenance intervals based on the number of hours of operation of the power equipment and the efficiency of the outdoor power equipment based upon the discharge status of the starter battery pack 26.

Although not illustrated in the drawing Figures, the system of the present disclosure could include an interface that would allow multiple battery packs to be connected in parallel with each other. In such a system, at least one of the battery packs would include a push button that would allow the voltage and current from the parallel connected battery packs to flow to the starting circuit of the outdoor power equipment. Such an embodiment may be utilized when the multiple battery packs are combined and used with a snow thrower that operates in sub-zero temperatures. Parallel connected battery packs would also be desirable in embodiments where the battery packs are used to start larger engines that require more current to crank over than can be provided by a single battery pack. In such systems, it is again contemplated that only one of the battery packs would include the start button.

As indicated in the above description, the starter battery pack 26 includes a start button 28 that is included within the battery pack such that the battery pack and start button would be removable as a single unit. The start button on the battery pack allows the user to initiate operation of the lawn tractor right from the battery pack and prevents operation when the battery pack is not present. The connection between the battery pack and the starting system of the lawn tractor can vary. In addition, the control circuit contained within the battery pack can also vary in complexity and functionality. However, integrating the push button directly into the battery pack allows the system of the present disclosure to eliminate the need for a lead acid battery while also presenting the push button at a desirable location for the user.

Figure 7:
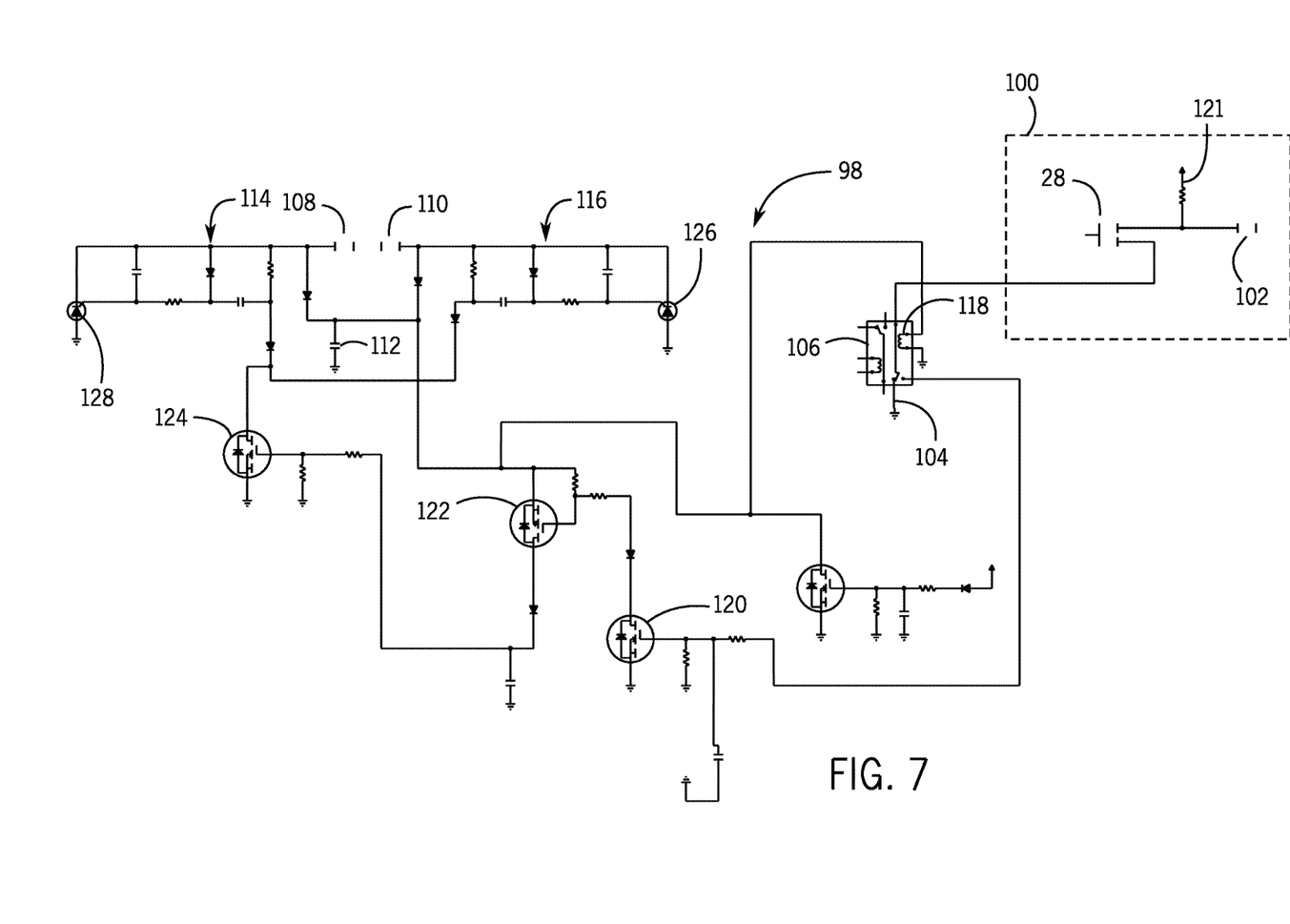
FIG. 7 is a circuit schematic illustrating one embodiment of the starting circuit contained within the starter battery pack.

FIG. 7 illustrates one possible embodiment of the engine control circuit 98 that is incorporated into the battery receptacle or the power equipment and can be utilized to provide the 12-volt output from the starter battery pack 100 to the electric starter motor to initiate operation of the internal combustion engine of the lawn tractor. The engine control circuit 98 can be located in any one of multiple locations on the outdoor power equipment. A preferred location is within the battery receptacle.

Although the engine control circuit is shown outside of the starter battery pack 100 in FIG. 7, it is contemplated that the engine control circuit 98 could be contained within the starter battery pack 100. In such an embodiment, the size of the starter battery pack 100 would need to be increased to include all of the operating components and additional electrical I/O connections from internal combustion engine would need to be provided to the starter battery pack 100. For this reason, in the preferred embodiment of the disclosure shown in FIG. 7 the engine control circuit 98 is located outside of the starter battery pack 100 and is electrically connected to the starter battery pack as shown.

As illustrated in FIG. 7, the start button 28 is included in the starter battery pack 100 and is connected to an enable pin 102. When the battery pack 100 is installed into the battery receptacle and the operator depresses the start button 28, ground 104 of the switching relay 106 is connected to the enable pin 102. When ground is connected to the enable pin 102, the battery electronics turn on the 12-volt output which provides the 12-volt output to the electric starter motor, thereby causing the starter motor to start cranking the internal combustion engine.

As the engine rotates during the starting process, the rotation of the engine generates positive pulses on both ignition coils of the twin cylinder engines. These pulses are seen on terminals 108 and 110. In an embodiment in which only a single cylinder engine is utilized, only a single ignition signal would be provided.

The positive voltage pulses present at terminals 108 and 110 begin to charge capacitor 112. As the engine speed increases, the pulses at the terminals 108, 110 become more frequent and begin to increase the charge the capacitor 112. Once the charge on the capacitor 112 is sufficient, the charge on the capacitor 112 turns on the relay coil 118 contained within the relay 106. Once the relay coil 118 is turned on, the switch within the relay 106 opens, thereby disconnecting the ground 104 from the enable pin 102. At this time, the controller within the battery pack 100 determines that the internal combustion engine has begun operation.

Once the ground has been removed from the enable pin 102, the enable terminal is connected to the base of MOSFET 120. When the engine is running, if the operator again depresses the start button 28, the second press of the start button routes the 3.3 volt signal present at terminal 121 within the battery pack 100 out to the connected base of the MOSFET 120. The 3.3 volt signal turns on the MOSFET 120, which in turn turns on MOSFETs 122 and 124. Activation of the MOSFETs 122 and 124 in turn turns on the SCR 126 and the SCR 128. Turning on of the SCRs 126 and 128 kills the spark signal, which causes the engine to stop operation.

When the engine stops, the signals present at terminals 108 and 110 are eliminated, which discontinues charging of capacitor 112. As the capacitor 112 discharges, the relay 118 is de-energized, causing the relay to release and return to the initial condition where the ground 104 is connected to the enable pin 102. Upon the next press of the start button 28, the process begins again to start the internal combustion engine.

Although one example of the engine control circuit 98 is shown in FIG. 7, it should be understood that various other types of circuitry could be utilized while operating within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. Outdoor power equipment comprising:
an internal combustion engine;
an electric starter motor stationarily mounted on the outdoor power equipment and coupled to the internal combustion engine to start the internal combustion engine; and
a starter battery pack configured to be removably received on the outdoor power equipment to provide electric power to the starter motor, wherein the starter battery pack includes a start button such that when the start button is activated, electric power is supplied from the starter battery pack to the starter motor to start the internal combustion engine.

2. The outdoor power equipment of claim 1 wherein the starter battery pack includes a plurality of battery cells and the plurality of battery cells and the start button are contained within an outer housing.

3. The outdoor power equipment of claim 2 further comprising a battery receiver positioned on the outdoor power equipment and sized to receive the starter battery pack and allow removal of the starter battery pack without tools.

4. The outdoor power equipment of claim 3 wherein the start button is located on the outer housing such that the start button is accessible by a user when the starter battery pack is received in the battery receiver.

5. The outdoor power equipment of claim 1 wherein the starter battery pack includes at least one indicator to visually indicate an operating parameter of the starter battery pack or the internal combustion engine.

6. The outdoor power equipment of claim 5 wherein the operating parameter is at least one of a state of charge of the starter battery pack and an operating status of the internal combustion engine.

7. The outdoor power equipment of claim 1 further comprising an engine control circuit configured to allow electric power to be provided to the starter motor upon activation of the start button when the internal combustion engine is not operating and terminate operation of the internal combustion engine upon activation of the start button when the internal combustion engine is operating.

8. The outdoor power equipment of claim 7 wherein the engine control circuit is located on the outdoor power equipment.

* * * * *